(12) United States Patent
Leak et al.

(10) Patent No.: US 6,182,072 B1
(45) Date of Patent: Jan. 30, 2001

(54) METHOD AND APPARATUS FOR GENERATING A TOUR OF WORLD WIDE WEB SITES

(75) Inventors: Bruce A. Leak, Palo Alto; Michael A. Killianey, San Francisco, both of CA (US)

(73) Assignee: WebTV Networks, Inc., Mountain View, CA (US)

( * ) Notice: Under 35 U.S.C. 154(b), the term of this patent shall be extended for 0 days.

(21) Appl. No.: 08/824,039

(22) Filed: Mar. 26, 1997

(51) Int. Cl.$^7$ .................................................. G06F 17/30

(52) U.S. Cl. .......................... 707/10; 707/3; 707/104; 707/513; 348/6

(58) Field of Search ............................... 707/2, 10, 501, 707/513, 3, 104, 500; 395/200.57, 200.58; 345/340, 327; 348/6

(56) References Cited

U.S. PATENT DOCUMENTS

| | | | |
|---|---|---|---|
| 5,321,423 | 6/1994 | Yoshizawa et al. | 345/185 |
| 5,325,423 | 6/1994 | Lewis | 379/90 |
| 5,343,560 | 8/1994 | Takeda et al. | 395/166 |
| 5,438,662 | 8/1995 | Randall | 395/161 |
| 5,488,411 | 1/1996 | Lewis | 348/8 |
| 5,530,852 | 6/1996 | Meske, Jr. et al. | 395/600 |
| 5,538,255 | 7/1996 | Barker | 463/41 |
| 5,558,339 | 9/1996 | Perlman | 463/42 |
| 5,564,001 | 10/1996 | Lewis | 395/154 |
| 5,586,257 | 12/1996 | Perlman | 463/42 |
| 5,603,025 | 2/1997 | Tabb et al. | 395/602 |
| 5,612,730 | 3/1997 | Lewis | 348/8 |
| 5,649,188 | 7/1997 | Nomura et al. | 395/611 |
| 5,696,982 | 12/1997 | Tanigawa et al. | 395/790 |
| 5,717,860 * | 2/1998 | Graber et al. | 395/200.57 |
| 5,727,156 * | 3/1998 | Herr-Hoyman et al. | 709/219 |
| 5,737,599 * | 4/1998 | Rowe et al. | 707/104 |
| 5,737,619 * | 4/1998 | Judson | 707/500 |
| 5,761,485 | 6/1998 | Munyan | 395/500 |
| 5,784,058 * | 7/1998 | LaStrange et al. | 345/340 |
| 5,787,254 * | 7/1998 | Maddalozzo, Jr. et al. | 707/501 |
| 5,809,317 * | 9/1998 | Kogan et al. | 395/762 |
| 5,835,712 * | 11/1998 | DuFresne | 395/200.33 |
| 5,889,950 * | 3/1999 | Kuzma | 348/6 |
| 5,890,171 * | 3/1999 | Blumer et al. | 707/501 |
| 5,895,462 * | 4/1999 | Toki | 707/3 |
| 5,929,850 * | 7/1999 | Broadwin et al. | 345/327 |
| 5,958,016 * | 12/1999 | Chang et al. | 709/229 |
| 5,987,480 * | 12/1999 | Donohue et al. | 707/501 |
| 5,996,011 * | 11/1999 | Humes | 709/225 |
| 5,999,929 * | 12/1999 | Goodman | 707/7 |
| 6,005,563 * | 12/1999 | White et al. | 345/327 |

OTHER PUBLICATIONS

Hauk, Franz J., "Supporting Hierarchical Guided Tours in the World Wide Web," Fifth International World Wide Web Conference, pp. 1–13, May 1996.*

(List continued on next page.)

*Primary Examiner*—Hosain T. Alam
*Assistant Examiner*—Ella Colbert
(74) *Attorney, Agent, or Firm*—Workman, Nydegger & Seeley

(57) ABSTRACT

A method is provided of displaying World Wide Web pages on a display device. A number of hypertext links are identified, wherein each hypertext link is for locating one of a plurality of Web pages. The hypertext links may be identified from a particular Web page or from results of a Web search. Web pages are retrieved using the identified hypertext links. Additional Web pages may be retrieved from Web pages that have been retrieved. Retrieved Web pages are automatically displayed in a sequence on the display device to form a visual tour of certain World Wide Web sites. The sequence may be based on any of various criteria, such as the subject matter of Web pages, the particular distribution of Web pages among Web sites, or the relative popularity of Web sites. A progress indication is displayed to indicate the Web page in the sequence that is currently being displayed.

37 Claims, 13 Drawing Sheets

OTHER PUBLICATIONS

Braverman, Alan, "CCI Slide Show," www.ncsa.edu/SDG/Software/XMosaic?CCI/cci–slide–show., pp. 1–3, May 1996.*

Abstract, Anon, "Four Audio Distribution Options in the News," *Electron. Doc.*, vol. 4, No. 9, Sep. 1995, pp. 20–22.

Abstract, Ratcliffe, M., "Real Progress: The Internet as Information Utility," *Digital Media*, vol. 4, No. 12, May 10, 1995, pp. 19–22.

Abstract, Vincent, T., "Digital Audio and Disabled Learners," *Innovations in Education and Training International*, vol. 33, No. 1, Feb. 1996, pp. 66–67.

Abstract, "Realvideo Unveiled," *Computer Reseller News*, No. 724, Feb. 24, 1997, p. 69.

Abstract, Davey, T., "Ad–free News to Desktops," *InformationWeek*, Jan. 20, 1997, No. 614, p. 68, 70.

Dvorak, John C., "When Push Comes to Shove; Internet Push Technology is not a Good Idea," *PC Magazine*, Mar. 25, 1997, No. 6, vol. 16, p. 87.

*PCMagazine*, "Webcasting Takes off; Use of World Wide Web to deliver Software, Customized News Services," Feb. 18, 1997, No. 4, vol. 16, p. 9.

Kaufthal, Jon, "Web News While You Work," *PCMagazine*, Mar. 25, 1997, No. 6, vol. 16, p. 70.

Muchmore, Michael W., "News You Choose; Customizable Online News Services," *PCMagazine*, Apr. 9, 1996, vol. 15, No. 7, p. 199.

Abstract, Smith, J., "RealAudio client 3.0," *MacUser*, vol. 12, No. 22, Oct. 25, 1996. p. 72.

Michael Moeller Caching software speeds browsing (Peak Technologies' Peak Net.Jet) Dec. 2, 1996 PC Week, v13, n48, p. 33 (2).

Ben Goodman Untangling the Web with a PIM (CE Software WebArranger 2.0 personal information manager) Aug. 1996 Computer Shopper, v16, n8, p. 444 (1).

"Four Audio Distribution Options in The News", Dialog(R) File 248:PIRA, (c) 1997 Pira International, 1 pg.

"RealAudio client 3.0", Dialog(R) File 248:PIRA, (c) 1997 Pira International, 1 pg.

"Real Progress: The Internet As Information Utility", Dialog(R) File 248:PIRA, (c) 1997 Pira International, 1 pg.

"Digital Audio And Disabled Learners", Dialog(R) File 2:Inspec (c) 1997 Institution of Electrical Engineers, 1 pg.

"Emerging Technologies—New Opportunities In Platforms", Dialog(R) File 647:CMP (c) 1997 CMP, 1 pg.

* cited by examiner

METHOD AND APPARATUS FOR GENERATING A TOUR OF WORLD WIDE WEB SITES

FIELD OF THE INVENTION

The present invention pertains to the field of network-based processing systems. More particularly, the present invention relates to processing systems configured to allow browsing of the World Wide Web.

BACKGROUND OF THE INVENTION

The World-Wide Web ("the Web") is a collection of formatted hypertext pages and other information distributed among numerous computers logically connected by the Internet. The Web is a valuable resource for information relating to virtually any subject, including business, education, entertainment, and travel, to name just a few. Advances in Internet-related technology, such as Web browsers (software applications which provide a user interface to the Web), have made the Web accessible to a large segment of the population.

Despite rapid advances in Web browsers, however, access to the Web has until recently been limited to people who own a personal computer. Many people cannot afford a personal computer, however, and others have anxiety about using computers. In addition, certain Web browsers in the prior art generally do not provide the degree of user-friendliness desired by some people who lack computer experience, and many computer novices do not have the patience to learn how to use the software. In contrast, most people in modern society are quite comfortable with their television sets. Even ardent technophobes tend to view the television set as a familiar part of daily life. Most people are also comfortable using a remote control to operate a television set, a video cassette recorder (VCR), home audio system, or other electronic device. Consequently, WebTV Networks Inc., of Palo Alto, Calif., has developed technology to allow people to access the Web through their television sets. This technology is known as "WebTV™" and is currently available through Philips Magnavox and Sony Electronics Inc.

WebTV allows a person to access and navigate through Web pages using an ordinary television set and a remote control. More specifically, WebTV is designed so that a person can use a remote control to navigate between hypertext objects on a Web page with little effort or thought, so that a person feels more as if he is simply changing the channels on a television set, rather than using a complex, global computer network. Hence, one basic quality of WebTV is to make Web browsing more comfortable for people by making it feel more like watching television.

A person watching television sometimes has nothing specific that he wishes to watch. Accordingly, he can switch from channel to channel until he finds something interesting, or he can simply leave the television tuned to a particular channel and watch whatever is provided. In contrast with watching television, however, Web browsing tends to require more effort by the person to actively seek out and locate specific information. Information is often located through the use of software known as a search engine. Yet, as with watching television, a person may wish to browse the Web without having specific goal in mind, i.e., he may wish to "surf" the Web. Even if the person has a specific goal in mind, manually sifting through results of a Web search can be tiring. Therefore, it is desirable to make Web browsing even more like watching television, so that less effort is required by a person to view Web pages. In particular, it is desirable to allow a person to view a number of Web pages without having to specifically locate or request those Web pages.

SUMMARY OF THE INVENTION

The present invention pertains to a machine-implemented method of displaying hypertext documents on a display device. In the method, a number of logical addresses are received, each of which represents a hypertext link to one of the hypertext documents. The hypertext documents are then received using the logical addresses. The hypertext documents are then automatically displayed on a display device in a sequence.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for generating a tour of World Wide Web pages are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes a method and apparatus for automatically displaying a sequence of World Wide Web (hereinafter "Web") pages. The effect is to provide a user with a "tour" of certain Web pages or Web sites. The user can thereby view a number of Web pages with little or no input, i.e., without having to specifically request each Web page. A displayable sequence of Web pages may be generated from one or more given Web pages, such as the results obtained from a conventional search engine. The effect of the tour is that Web browsing can be made a more presentational experience, such as when watching television.

The present invention includes steps which, in one embodiment, are encoded in machine-executable software instructions, such that the present invention is carried out in a processing system by a processor executing the instructions. In other embodiments, hardwired circuitry may be used in place of, or in combination with, software instructions to implement the present invention.

In one embodiment, the present invention is included in a system known as WebTV™ (hereinafter "WebTV"), which uses a standard television set as a display device for browsing the Web and which connects to the Internet using a standard telephone, ISDN, Ethernet, or other similar communication path. A user of a WebTV client system can utilize WebTV Network services provided by one or more WebTV servers. The WebTV Network services are used in conjunction with software running in a WebTV client system to browse the Web, send electronic mail, and to make use of the Internet in various other ways. The WebTV servers generally function as proxies by retrieving Web pages and other data requested by a WebTV client system from remote Web servers and then providing the information to the WebTV client system.

I. System Overview

Figure 1:
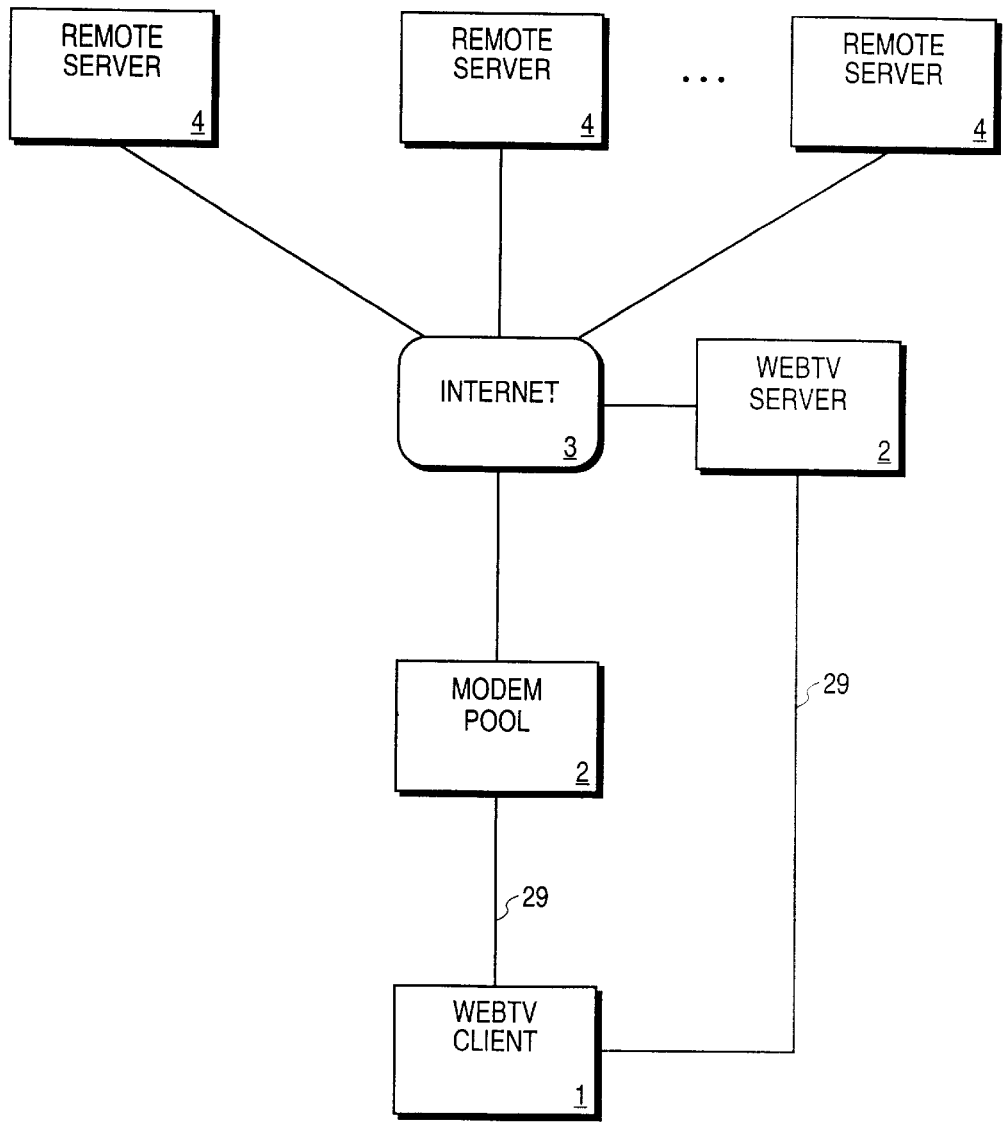
FIG. 1 illustrates a WebTV client system connected to a WebTV server system.

FIG. 1 illustrates a configuration of a WebTV network according to one embodiment. A WebTV client 1 is coupled to a modem pool 2 via direct-dial, bi-directional data connections 29, which may be a conventional telephone, i.e., "plain old telephone service" (POTS), ISDN (Integrated Services Digital Network) link, Ethernet, or any other suitable type of data connection. The modem pool 2 is coupled typically through a router, such as that conventionally known in the art, to a number of remote servers 4 (i.e., conventional Web servers) via a conventional network infrastructure 3, such as the Internet. The WebTV system also includes a WebTV server 5, which implements WebTV Network services and specifically supports the WebTV client 1. The server 5 generally includes one or more conventional computer systems. The server 5 may actually comprise multiple physical and logical devices connected in a distributed architecture. The client 1 can connect to the server 5 through POTS, ISDN, or Ethernet connection or through the Internet 3 via the modem pool 2. Note that the modem pool 2 is a conventional modem pool, such as those found today throughout the world providing access to the Internet and private networks. The modem pool 2 may be provided by a local Internet Service Provider (ISP).

A. WebTV Client System

Figure 2:
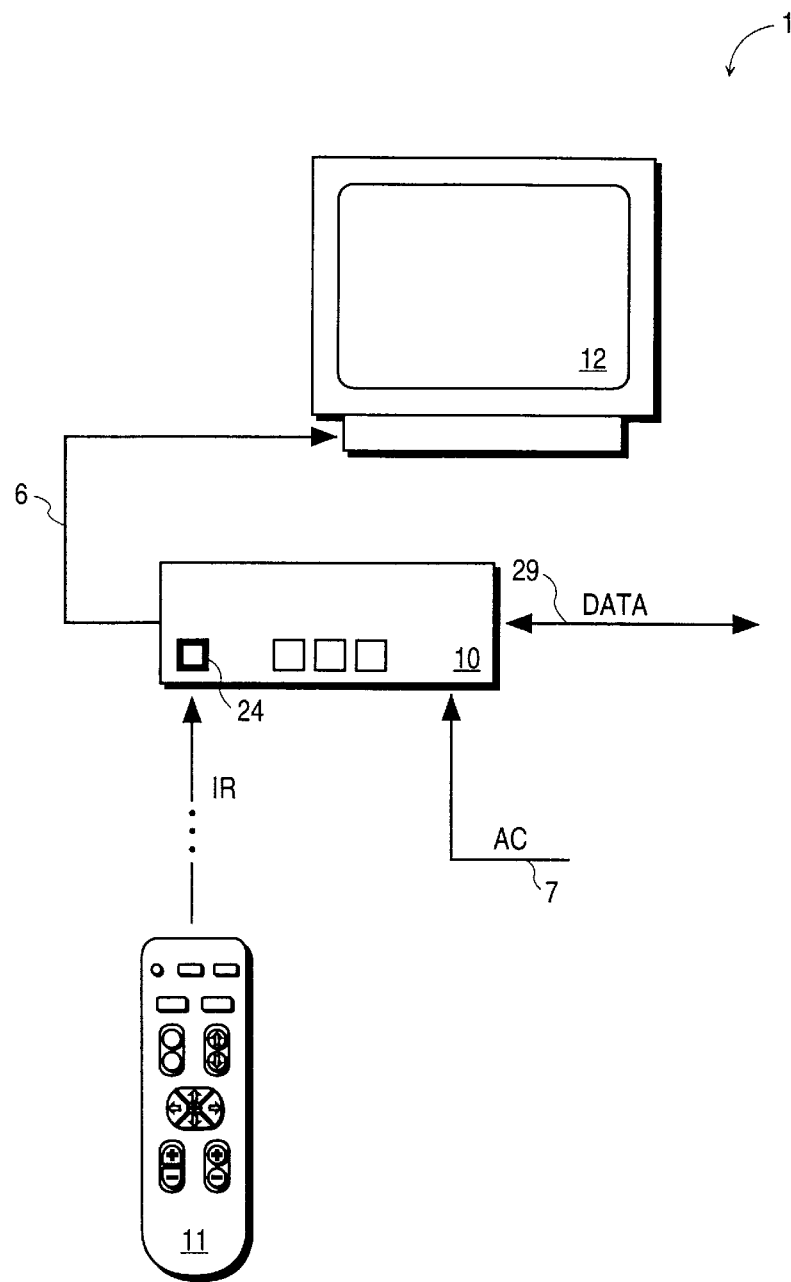
FIG. 2 illustrates a WebTV client system.

FIG. 2 illustrates a WebTV client system 1 according to one embodiment. The client system 1 includes an electronics unit 10 (hereinafter referred to as "the WebTV box 10" or "the box 10"), an ordinary television set 12, and a hand-held remote control 11. In an alternative embodiment (not shown), the WebTV box 10 is built into the television set 12 as an integral unit. The box 10 includes hardware and software for providing the user with a graphical user interface, by which the user can access the WebTV Network services, i.e., browse the Web, send e-mail, etc.

The client system 1 uses the television set 12 as a display device and an audio output device. The box 10 is coupled to the television set 12 by a link 6. The link 6 includes an audio channel for generating sound from the television's speaker and an RF (radio frequency), S-video, composite video, or other equivalent form of video channel. The data link 29 between the box 10 and the server 5 is a conventional telephone (POTS), ISDN, Ethernet, or other suitable data connection. The box 10 receives AC (alternating current) power through a standard AC power line 7.

Remote control 11 is operated by the user in order to control the client system 1 to browse the Web and otherwise access the Internet. The box 10 receives commands from remote control 11 via an infrared (IR) communication link. In alternative embodiments, the link between the remote control 11 and the box 10 may be an RF link or any other suitable type of link.

Figure 3:
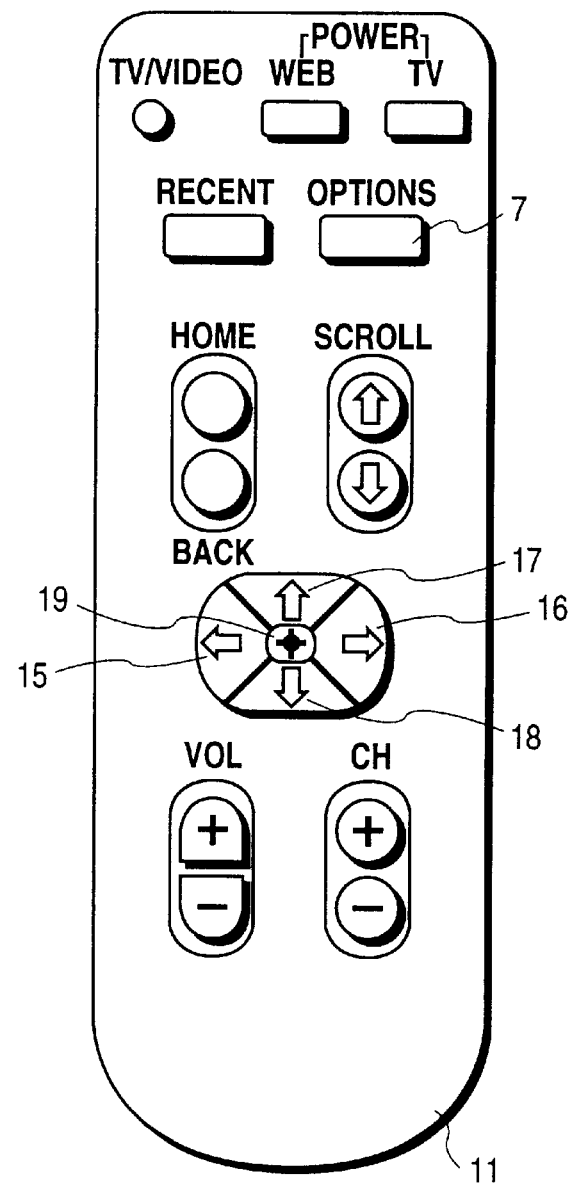
FIG. 3 illustrates a hand-held remote control device for interacting with a user interface of a WebTV client system.

FIG. 3 illustrates the remote control 11 in greater detail. In one embodiment, remote control 11 is similar to a conventional hand-held remote control that is used to control a television set. In fact, remote control 11 may include conventional controls for controlling the standard functions of the television set 12, in addition to controls related to the present invention. In an alternative embodiment, remote control 11 may be a wired hand-held controller, a wired or wireless (e.g., IR) keyboard, or any other similar device. As shown in FIG. 3, the controls of remote control 11 include direction buttons 15–18 and Enter button 19. Direction buttons 15–18 include a Left button 15, a Right button 16, an Up button 17, and a Down button 18.

Figure 4:
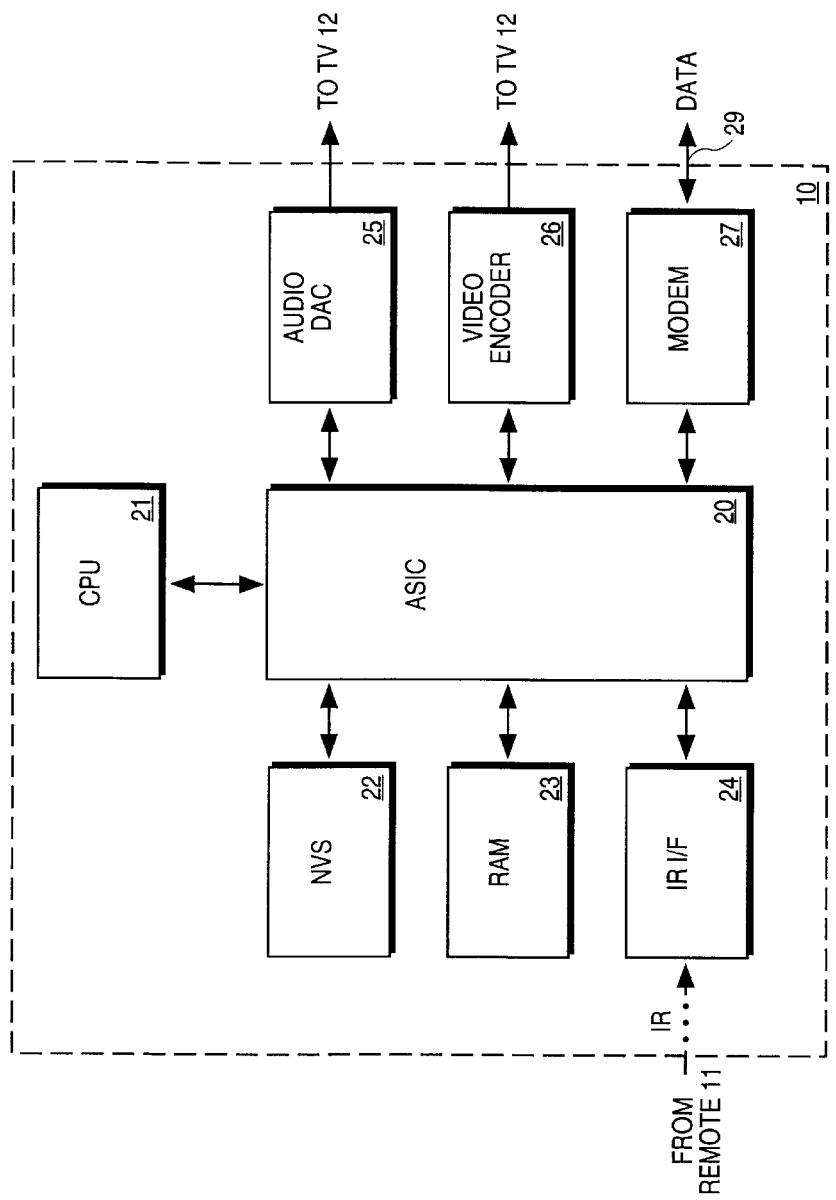
FIG. 4 is a block diagram of an electronics unit of a WebTV client system.

FIG. 4 shows the internal components of the box 10, according to one embodiment. Operation of the client system 1 is controlled by a CPU 21, which is coupled to an Application-Specific Integrated Circuit (ASIC) 20. The CPU 21 executes software designed to implement features of the present invention. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A modem 27 is coupled to ASIC 20 to provide the connection 29 to the modem pool 2 and (via the Internet 3) to the remote servers 4. Note that modem 27 may be a conventional telephone modem, an ISDN or Ethernet adapter, or any other suitable data communication device. Also, in other embodiments the client's communication link with the server 5 may be of various different types, such as a token ring or Ethernet connection.

Also coupled to ASIC 20 is a non-volatile storage (NVS) device 22. NVS 22 may include standard mask Read-Only Memory (ROM) as well as programmable-erasable memory, such as electrically-erasable programmable ROM (EEPROM) or flash memory. Also coupled to ASIC 20 is a Random Access Memory (RAM) 23, which is a volatile storage facility. NVS 22 provides storage of certain program instructions and data, as will be described below. Note that a mass storage device (not shown) may be optionally coupled to the box 10 to provide additional storage capacity.

The WebTV box 10 includes software which, when executed by a processor in the box 10, provides the user with a graphical user interface by which the user can access the WebTV Network services and browse the Web. The software includes application software for providing a Web browser as well as operating system (OS) software, which includes device drivers and otherwise interfaces the application software with the system hardware components (see FIG. 4). In one embodiment, both the application software and the OS are stored in NVS 22 and may be loaded into RAM 23 as required.

As mentioned above, in one embodiment the steps of the present invention (which are described below) are embodied in machine-executable instructions. For example, the present invention can be carried out by the CPU 21 executing sequences of instructions contained in memory (i.e., NVS 22, RAM 23, or a combination thereof). More specifically, execution of the sequences of instructions causes the CPU 21 to perform the steps of the present invention. Instructions for carrying out the present invention may be loaded into memory from a mass storage device. In addition, instructions may be loaded into memory from one or more other "host" computer systems.

If instructions are loaded into memory from a "host" computer system, the host computer system may, for example, transmit a sequence of instructions to the client system 1 in response to a message transmitted to the host computer system over the Internet 3 by the client system 1. As the client system 1 receives the instructions via a network connection (e.g., connection 29), the client system 1 stores the instructions in memory. The client system 1 may store the instructions for later execution or execute the instructions as they arrive over the network connection. In some embodiments, such downloaded instructions may be directly supported by the CPU 21. In that case, execution of the instructions could be performed directly by the CPU 21. In other embodiments, the instructions may not be directly executable by the CPU 21. Under those circumstances, the instructions may be executed by causing the CPU 21 to execute an interpreter that interprets the instructions, or by causing the CPU 21 to execute instructions which convert the received instructions into instructions that can be directly executed by the CPU 21.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

Certain aspects of the present invention may be also carried out in the WebTV server 5 instead of, or in addition to, being carried out in the WebTV client 1, as will be apparent from the discussion which follows.

B. WebTV Server System

Figure 5:
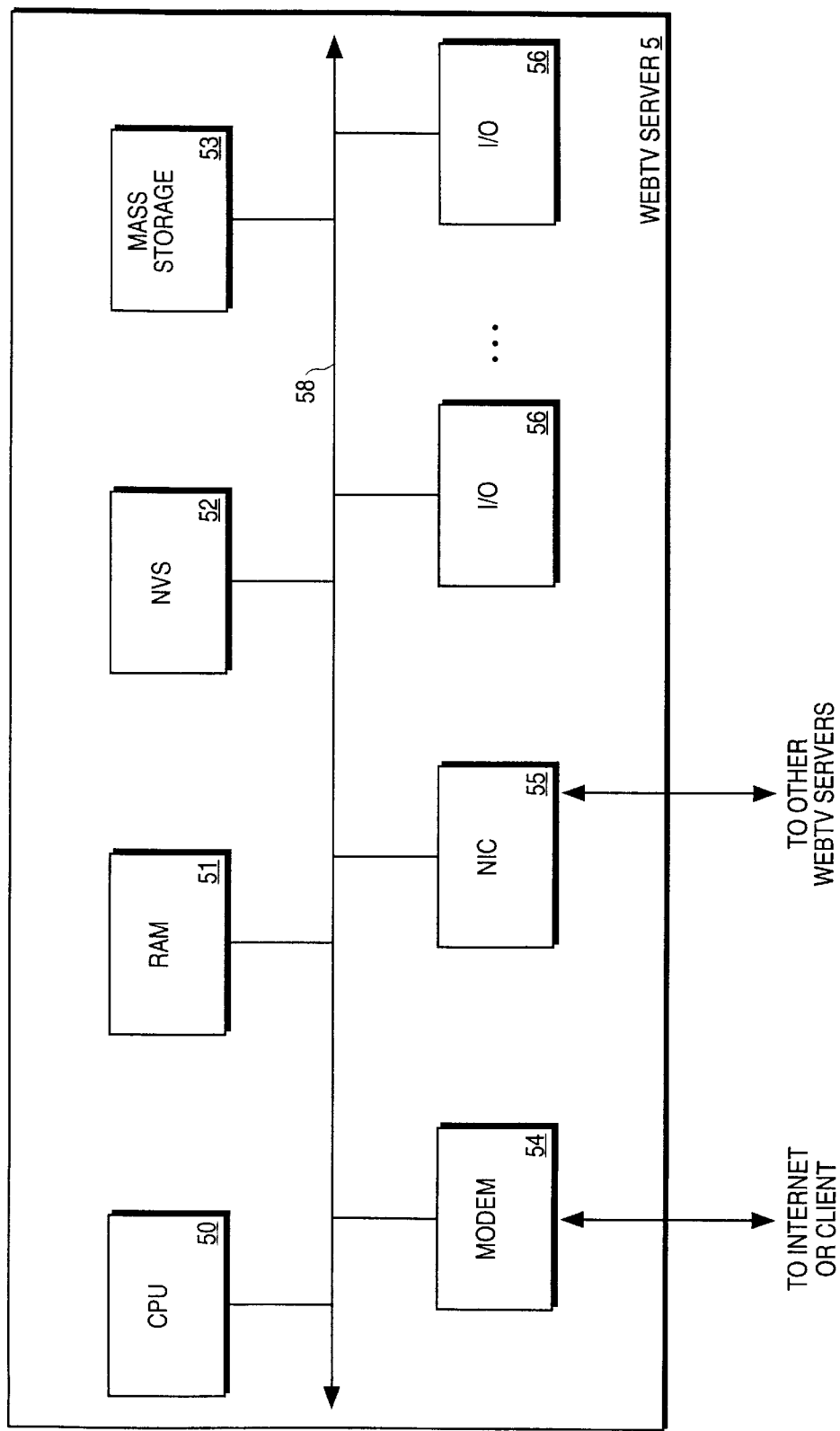
FIG. 5 is a block diagram of a WebTV server system.

The WebTV server 5 generally includes one or more computer systems having the architecture illustrated in FIG. 5. Note, however, that the illustrated architecture is only one possible architecture; a WebTV server 5 is not confined to such architecture. The illustrated architecture includes a central processing unit (CPU) 50, random access memory (RAM) 51, NVS (non-volatile storage) 52, a mass storage device 53, a modem 54, a network interface card (NIC) 55, and various other input/output (I/O) devices 56. NVS 52 may include programmable and/or programmable-erasable storage. Mass storage device 53 may include a magnetic, optical, or other equivalent mass storage medium. I/O devices 56 may include a monitor, a keyboard, a pointing device, and other similar devices. Modem 54 is used to communicate data to and from the remote servers 4 via the Internet. Modem 54 may be a conventional telephone (POTS) modem, an ISDN adapter, or any other suitable data communication device.

The WebTV server 5 may actually comprise multiple devices connected in a distributed architecture. Accordingly, modem 54 and NIC 55 may be used to provide data communication with other devices that provide WebTV Network services.

Note that certain steps of the present invention may be performed by the server 5, rather than the client 1. As with the client 1, such steps generally may be implemented using software, hardwired circuitry, or a combination thereof. Further, such steps may be embodied in software downloaded to the server 5 from another computer system.

Figure 6:
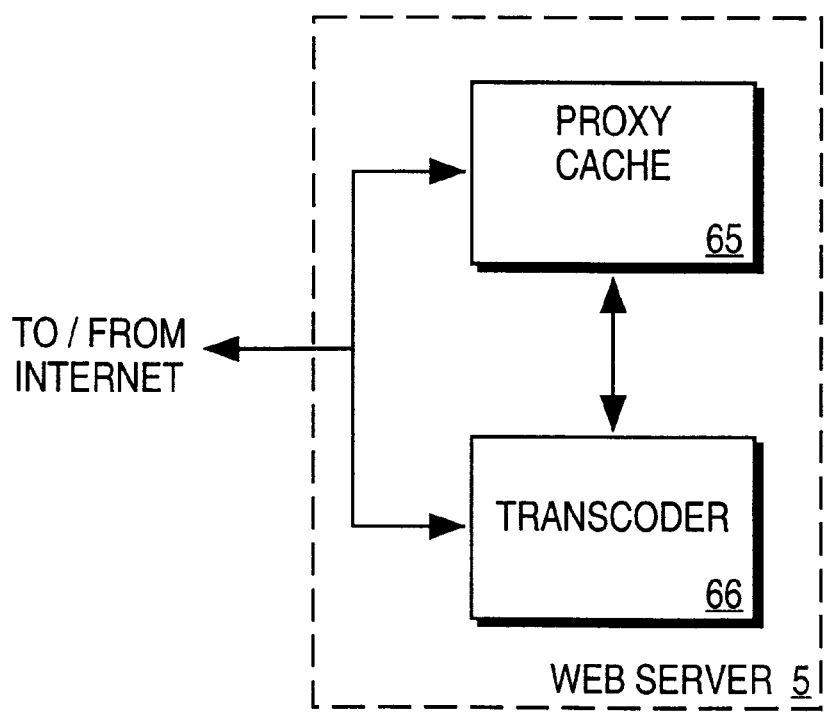
FIG. 6 illustrates a WebTV server system including a proxy cache and a transcoder.

In general, the WebTV server 5 functions as a proxy for the client 1 in providing the client 1 with access to the Web. The proxying functions include caching and transcoding (modifying) Web pages and various other data. Referring now to FIG. 6, the WebTV server 5 includes a proxy cache 65 and a transcoder 66, which are functionally coupled together and to the Internet 3. The proxy cache 65 provides temporary storage Web documents, images, and other information that is requested frequently by either the WebTV client 1 or the server 5. The transcoder 66 automatically modifies certain Web pages and other files retrieved from remote servers 4. Transcoding may be performed for various purposes, such as debugging or transmission efficiency. The details of the transcoder are not necessary to an adequate understanding the present invention.

II. Directed Touring of Web Sites

In accordance with the present invention, sequences of Web pages are displayed by the client system 1 without requiring the user of the client system to select and request each individual Web page. The effect is to provide a "tour" of Web pages to the user of the WebTV client system 1. A displayable sequence of Web pages may be generated from a currently-downloaded Web page, or from other data, such as a "hit list" obtained using a conventional Web search engine. These functions will be described below in greater detail.

Figure 7:
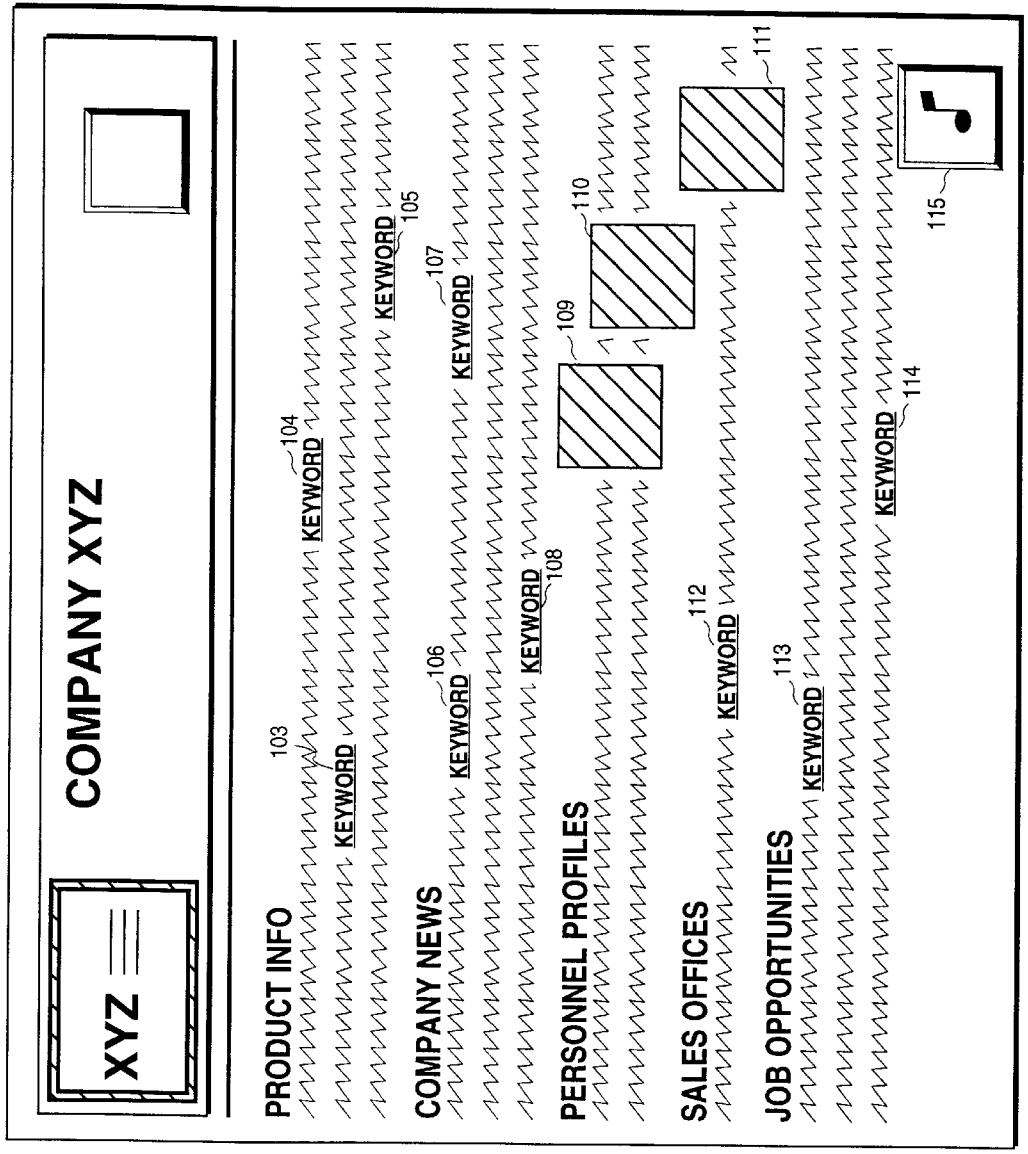
FIG. 7 illustrates a World Wide Web page.

As is well known, a Web page is a hypertext document stored on a Web server, such as one of the remote servers 4 in FIG. 1. Web pages are commonly written as Hypertext Mark-Up Language (HTML) documents. An HTML document may contain text and/or refer to images and other media types. FIG. 7 illustrates a Web page 100 as it is displayed by the client system 1 on the television 12. Web page 100 is the "home page" (top level page, or root level) of the Web site of a fictitious company, Company XYZ. An HTML document typically includes one or more "hypertext anchors". Hypertext anchors, which are also sometimes called "links", "hot links" or "hot spots", are displayable objects (text or image) that represent hypertext links to other Web pages or other data. A hypertext anchor may represent a link to different media types, such as an audio stream. Web page 100 includes a number of hypertext anchors 101–115. Anchors 103–108 and 112–114 are keywords or phrases representing hypertext links to pages related to those keywords. Hypertext anchors 109–111 are image maps. Hypertext anchor 115 provides a link to an audio stream, such as the jingle (theme song) of Company XYZ.

Each hypertext anchor in an HTML Web page is associated with a particular URI (Uniform Resource Identifier), which specifies the location (i.e., logical address) of another Web page or other data. Hypertext anchors and other displayable objects are identified in an HTML document by a number of "tags", which specify the attributes of the object, including the associated URI in the case of hypertext anchors. Consequently, the browser software can locate hypertext anchors and determine their corresponding URIs based on these tags.

Figure 8:
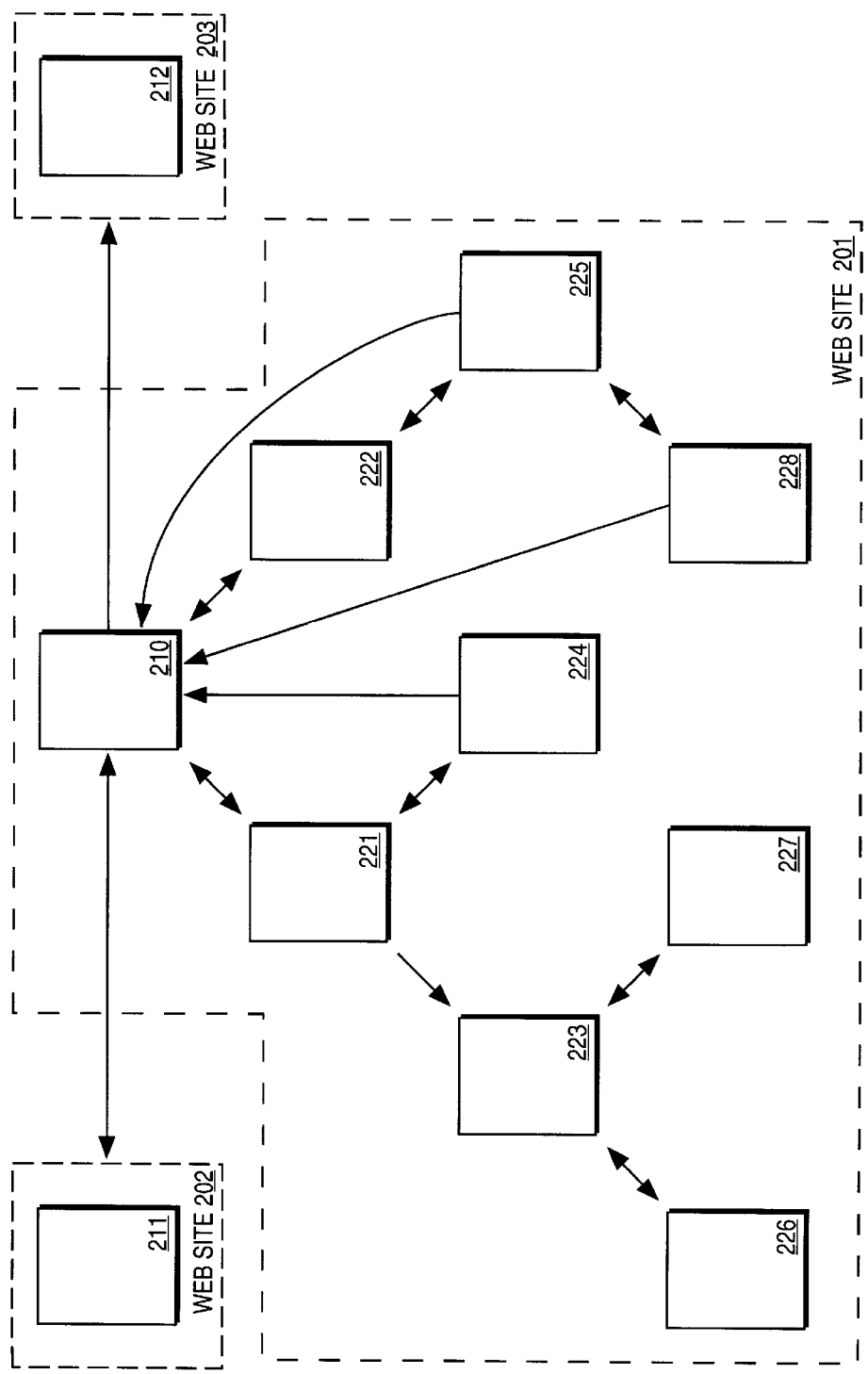
FIG. 8 illustrates a logical hierarchy of Web pages distributed among a number of Web sites.

The remote servers 4 which provide Web pages to other computer systems are commonly referred to as Web "sites." A Web site can be defined as one or more Web servers that are registered under one or more domain names for public or private information retrieval across a network. Any given site may store a number of Web pages. FIG. 8 illustrates three Web sites, i.e., sites 201, 202 and 203. Each of the Web sites 201–203 has a home page, i.e., Web pages 210, 211 and 212, respectively. The Web pages stored on sites 201–203 are arranged in a logical hierarchy, as shown in Web site 201. (Although FIG. 8 shows only the home pages 211 and 212 of sites 202 and 203, these Web sites may include other Web pages arranged in similar hierarchies.) The home page of each Web site represents the top level (level 1) of the hierarchy. The home page of each site contains an number of hypertext links to other Web pages on that Web site; for example, Web site 201 contains links to Web pages 221–228. Web pages 221 and 222, which are directly linked to home page 210, shall be referred to herein as second level (level 2) Web pages on Web site 201. Web pages 223, 224 and 225, which are directly linked to the second level Web pages, shall be referred to as third level Web pages of site 201. Similarly, Web pages 226, 227 and 228, which are directly linked to the third level Web pages, shall be referred to as fourth level Web pages of Web site 201.

Various functions involved in providing a tour of Web pages will now be described. Many of these functions can be performed by either the WebTV client system 1 or the WebTV server system 5. Further, certain steps of a given routine may be performed by the server 5 while other steps are performed by the client 1, as will be explained below.

Figure 9:
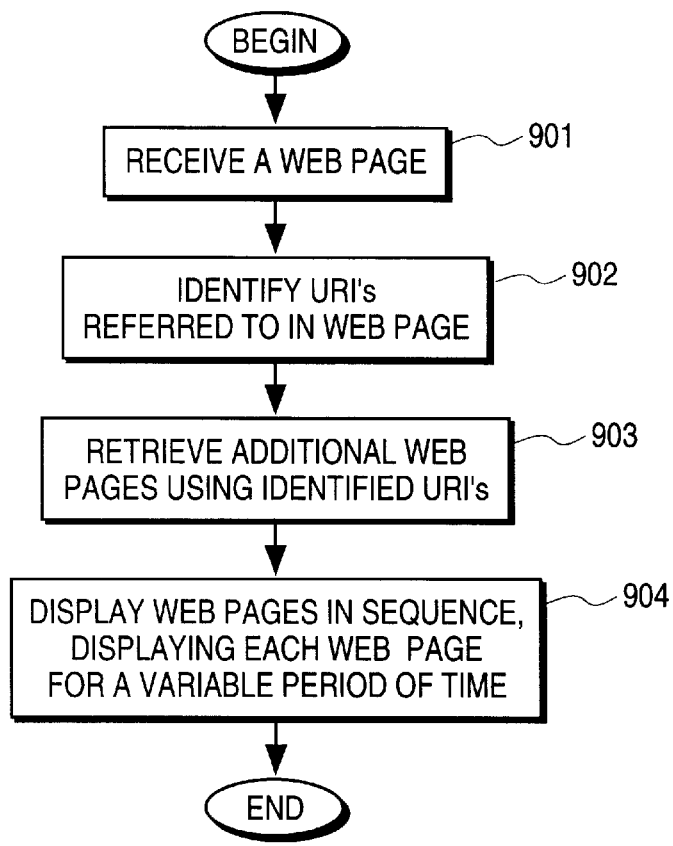
FIG. 9 is a flow diagram illustrating an overall routine for generating a tour of World Wide Web sites.

FIG. 9 illustrates an overall routine for providing a tour of Web pages according to a simple embodiment. Referring to FIG. 9, in step 901, the client system 1 initially receives a Web page (i.e., the top level Web page). The Web page may be received in response to the user of the client system 1 activating a hypertext link in another Web page, for example. In step 902, the client system 1 identifies URIs that are referred to by the received Web page. As noted above, the client system 1 is able to identify URIs based on the tags in an HTML document. In step 903, the client system 1 uses the identified URIs to request and receive each of the Web pages that are directly linked to the current Web page (i.e., the second level of Web pages). In step 904, the client system 1 displays these additional Web pages in a sequence, displaying each Web page for a defined period of time. In one embodiment, the period of time is defined based on the content of the current Web page and is therefore variable. For example, a Web page which has an audio file associated with it (e.g., music) may be displayed longer than other Web pages to allow the user to hear the entire audio file. In another embodiment, the defined period of time may be fixed (e.g., 10 seconds per page). Note that the order of steps 903 and 904 may be varied to accommodate the memory limitations of the client system 1. Specifically, the memory limitations of the client system 1 may prevent retrieval of all Web pages at the same time; therefore, it may be necessary to defer retrieval of some Web pages until other Web pages have been received and displayed.

Once the second level Web pages are retrieved based on the identified URIs, additional (third level) Web pages can be retrieved based on the URIs included in each of the second level Web pages, and so forth. The number of levels to be included in the tour can be limited based on the user's preference or a preset limit. Any given Web page may also have links to Web pages from other Web sites. Accordingly, a tour can be limited to a single Web site or to a given "range" of Web sites from an initial Web site (i.e., only Web sites directly linked to the current Web site). Thus, a Web tour may include Web pages of many different levels from many different Web sites, if desired.

Step 901 may be preceded or replaced by a step of receiving search results from a conventional search engine. Such search results normally are in the form of a "hit list", which generally includes brief descriptions of Web sites that meet the search criteria as well as the URIs of the found Web pages (although the URIs may not be displayed to the user). Hence, the URIs identified in step 902 may be identified from a hit list resulting from a Web search rather than from a single Web page.

In one embodiment, the URIs that are identified in step 902 are combined into a list, which may be used by the client 1 in step 903 to retrieve additional Web pages, if desired. The URI list may include information indicating the order of display of the Web pages, if desired. This sequence information may be implicit in the list itself (i.e., the order in which the URIs appear within the list) or it may consist of explicit information added to the list. In one embodiment, the client system 1 identifies any Web pages that have already been displayed in the tour and refrains from displaying such pages again. This may be accomplished by identifying and deleting (or flagging) duplicate URIs in the list.

Hence, the client system 1 automatically displays a sequence of Web pages without requiring the user to enter any input once the tour is initiated. However, the user may interrupt the tour or alter the tour at any time. Specifically, if the user sees a Web page that he would like to examine more closely, he may enter an input using the remote control 11. For example, by pressing the Options button 7, a pop-up menu or dialog box can be activated, by which the user can pause or terminate the tour. The user might also initiate the tour in a similar manner, from a currently displayed Web page or from hit list.

A tour can also be generated by the server system 5. For example, the server system 5 may provide a list of URIs to the client system, which the client system 1 then displays based on sequence information within the list. Alternatively, the server system 5 may download each page to the client system based on its own list. If the tour is generated on the server system 5, the tour may also be prepared manually, i.e., by a human being (such as WebTV Network staff). Specialized, pre-packaged tours can be prepared to accommodate the interests of particular WebTV customers. For example, tours relating to a specific subject may be prepared by compiling a list of appropriate URIs.

A continuous tour of Web pages can be generated, if desired. New URIs can be continuously added to the list as Web pages are displayed and their corresponding URIs are marked as "visited" and/or deleted from the list.

Figure 10:
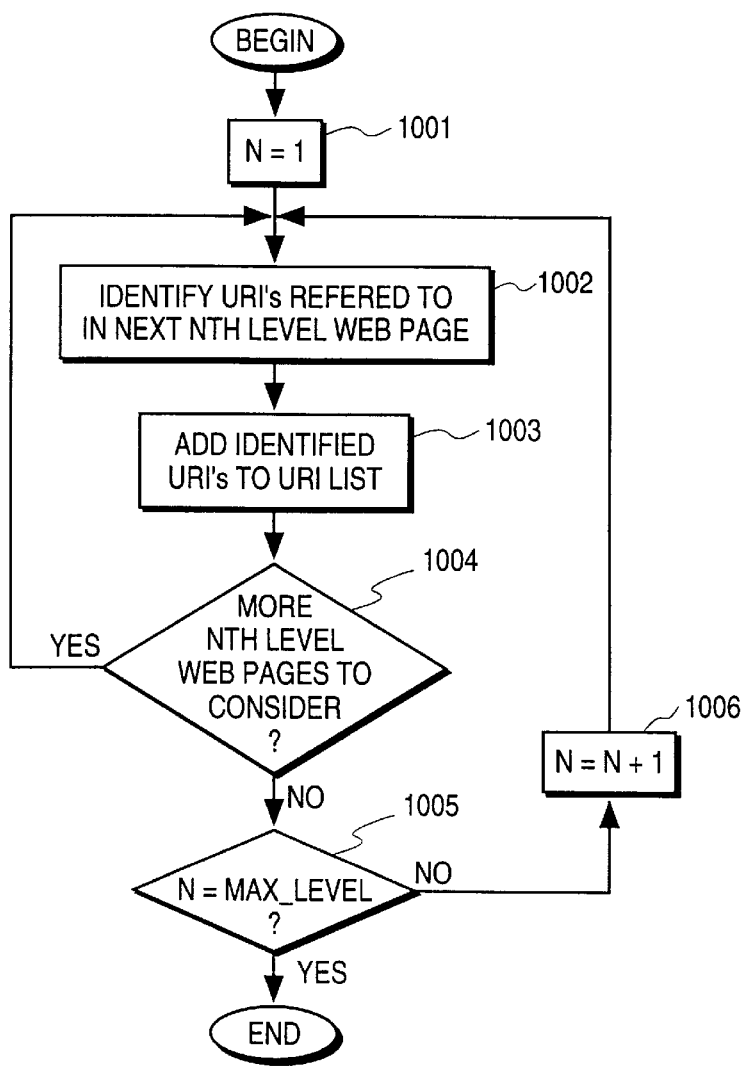
FIG. 10 is a flow diagram illustrating a routine for building a list of logical addresses.

FIG. 10 illustrates a routine for building a URI list according to one embodiment. In FIG. 10, N represents a current level within a Web page hierarchy for a given Web site. Thus, N=1 corresponds to the top (root) level, or home page, of the given Web site. Increasing values of N represent successive "generations" (i.e., levels increasing in "link distance" from the root level) in the hierarchy.

Assume now that either a single Web page or a hit list is currently stored in memory of the client system 1. (As indicated above, this routine may also be performed in the server system 5.) The routine of FIG. 10 begins in step 1001 with N set equal to one. In step 1002, all URIs referred to in the "next" Web page of level N are identified. There may be only one Web page of level one, such as when the URI list is to be derived from a single, currently-displayed Web page; in that case, that Web page is considered to be the "next" Web page of level N for the first iteration of step 1002. In contrast, there may be many level one Web pages, such as when the list is to be derived from a search hit list; in that case, any one of the Web pages can be considered to be the "next" Web page of level N for the first iteration of step 1002.

In step 1003, the URIs identified in step 1002 are added to the URI list. If there are additional Web pages available at level N, then the routine repeats from step 1002. Otherwise, the routine continues from step 1005 by determining whether N is currently equal to MAX_LEVEL, where MAX_LEVEL is defined as the deepest hierarchy level to be included in the tour. As noted above, MAX_LEVEL may be user-specified, or it may be a built-in limit. Alternatively, there may be no limit to the depth of the tour, and the tour may run continuously. If N is not equal to MAX_LEVEL, then N is incremented by 1 in step 1006, and the routine repeats from step 1002.

As noted above, the URI list may or may not contain information indicating the desired display order. Such information may be implicit in the order in which URIs appear in the list. Accordingly, the routine of FIG. 10 can be easily altered as necessary to produce the desired display order. Alternatively, information may be added explicitly to the URI list to indicate the order of display. In addition, the display order can be determined, in whole or in part, by the display routine, which is described below according to one embodiment (see FIG. 11). Therefore, it should be recognized that the present invention is not restricted to the specific routine of FIG. 10 for purposes of building a URI list.

It may be desirable to display all Web pages in a given line of descendency in the hierarchy before displaying any other Web pages in the hierarchy. Alternatively, it may be desirable to display all Web pages of a given level in the hierarchy before displaying any Web pages of a different level. The display order can also be based upon various other criteria, such as the relative popularities of the Web pages. Web pages' popularities are frequently tracked and provided by the corresponding Web sites as the number of hits on each Web page during a given time period. Alternatively, the order of display may be based upon the subject matter of the Web pages, such as the degree of relevance of a particular Web page to a user's specified search criteria. Relevance of a Web page may be determined, for example, based on how closely the contents of the Web page match the search criteria. The contents of the URI list can be filtered based on these or other criteria.

Additionally, some pages may be deemed inappropriate and may therefore be removed from the list or marked as "to be skipped" (or the like), so that these Web pages are not "visited" or displayed. Reasons for removing or not displaying pages include, but are not limited to: 1) the appropriateness of the site or page in terms of morals or ethics (e.g., as determined by a filter such as SurfWatch); 2) the appropriateness of a site or page based on knowledge of the site or content of the page (i.e., for informational reasons); 3) the presence or absence of specific HTML tags in, or headers supplied for, the Web document; and 4) the presence and content of a "/robots.txt" file on the Web site (as per the well-known "/robots.txt" standard.

Figure 11:
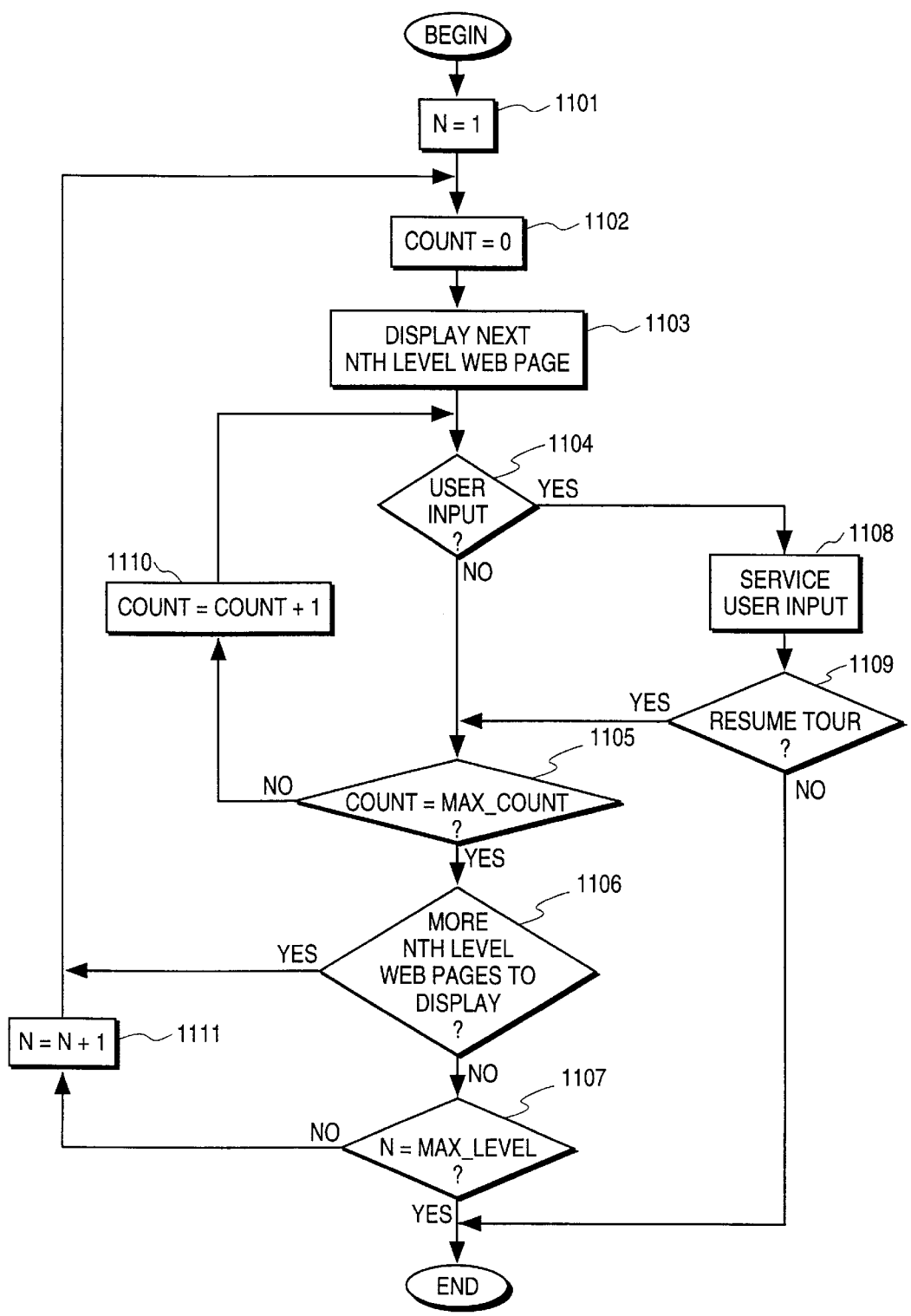
FIG. 11 is a flow diagram illustrating a routine for displaying a sequence of Web pages.

Once a URI list is constructed by (or provided to) the client system 1, the client system 1 displays the tour accordingly. Thus, FIG. 11 illustrates a routine for displaying a tour of Web pages according to one embodiment. The routine of FIG. 11 is based on the assumptions: 1) that the URI list contains no explicit information on the display order, and 2) that all Web pages of a given level are to be displayed before displaying Web pages of a different level. As in the routine of FIG. 10, N represents a current hierarchy level. In step 1101, N is set equal to one. In step 1102, a counter variable, COUNT, is set equal to zero. COUNT ranges in value from zero to MAX_COUNT. MAX_COUNT is set as necessary to achieve the desired display duration for each Web page. In step 1103, the client system 1 displays the next Web page of level N. During the first iteration of step 1103, the next Web page of level N is the first Web page to be displayed, as indicated by the sequence information in the URI list. In step 1104, it is determined whether a user input has been received, such as a user input requesting a pause or termination of the tour. If a user input has been received, then the user input is serviced in step 1108. After servicing the user input, it is next determined (based on the nature of the user input) whether the tour is to be resumed. If the tour is not to be resumed, the routine ends. If the tour is to be resumed, or if no user input was received in step 1104, then the routine continues from step 1105 by determining whether COUNT equals MAX_COUNT. If COUNT is not equal to MAX_COUNT, then COUNT is incremented by one in step 1110, and the routine then repeats from step 1104. If COUNT equals MAX_COUNT, then the currently displayed Web page has been displayed for a sufficient amount of time; accordingly, it is next determined in step 1106 whether there are additional Web pages of level N to display. If so, the routine repeats from step 1102 by resetting COUNT to zero, followed by the displaying in step 1103 of the next level N Web page, and so forth. If there are no more Web pages of level N to display, then it is determined in step 1107 whether N equals MAX_LEVEL. If N equals MAX_LEVEL, then the routine ends. Otherwise, N is incremented by one in step 1111, and the routine then repeats from step 1102.

Note that aspects of the routine of FIG. 11 can be performed on the server system 5. For example, the server 5 can provide each Web page in the tour to the client 1 in real time. Note also that the present invention is not restricted to the specific embodiment illustrated in FIG. 11 for purposes of displaying Web pages. Different variations of a display routine may be desirable. As noted above, it may be desirable to display all Web pages in a given line of descendency in the hierarchy before displaying any other Web pages in the hierarchy, for example. Display order may be dynamic or determined by an algorithm external to the WebTV unit or WebTV network.

To enhance the quality of the user's Web browsing experience, various user interface features can be provided in conjunction with the above-described routines. For example, the tour may include a visual progress indication, which indicates to the user the current degree of progress through the tour. A progress indication may be in the form of a numerical display showing how many Web pages have been previously displayed, how many Web pages have yet to be displayed, or both.

Figure 12:
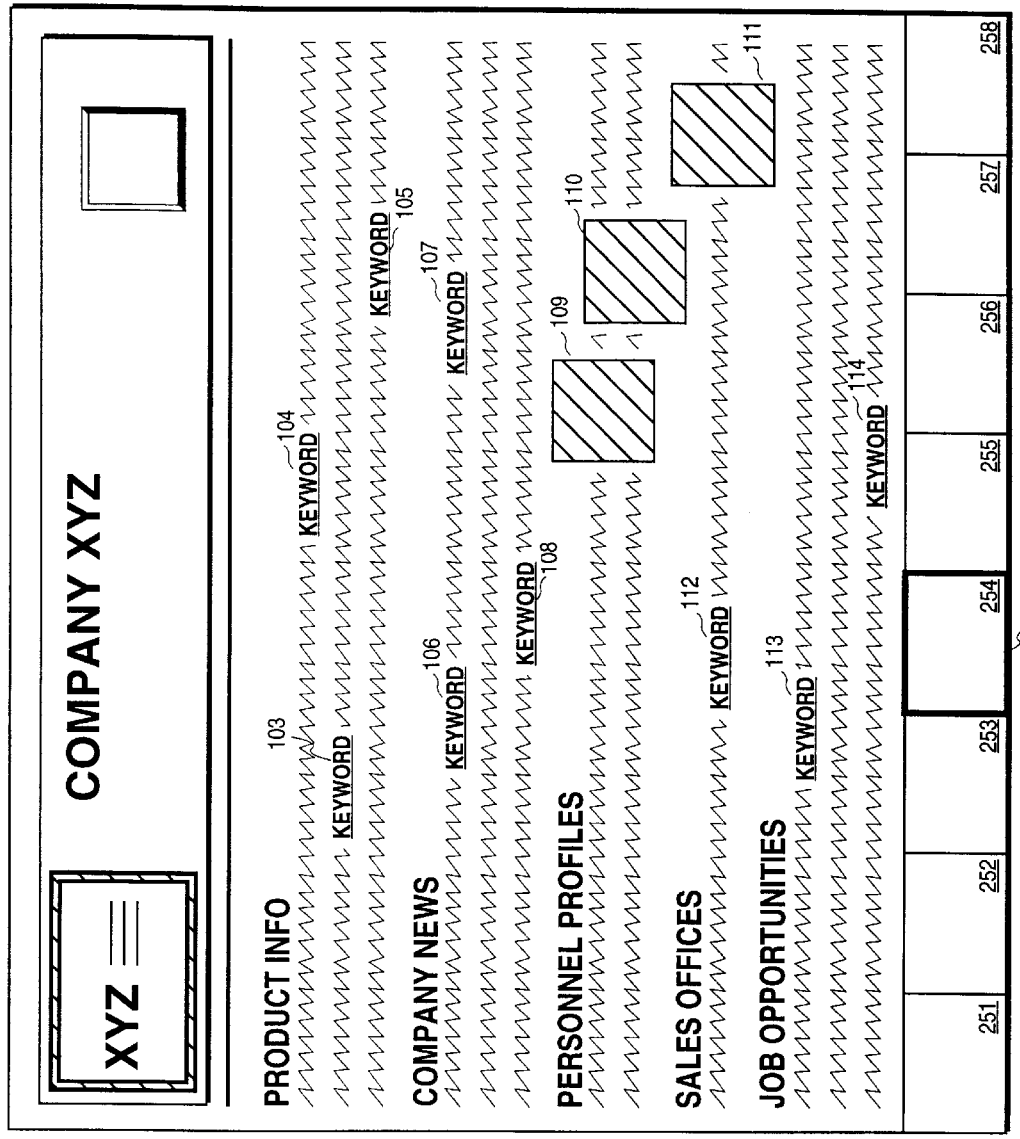
FIG. 12 illustrates a manner of displaying a Web page with a number of reduced-size images of Web pages superimposed thereon.

Another type of progress indication is illustrated in FIG. 12. FIG. 12 again illustrates the home page 100 of Company XYZ. In addition, a number of reduced size images 251–258 of Web pages have been displayed over Web page 100. (FIG. 12 does not show the content of images 251–258, because such content is not necessary for understanding the present feature.) The images 251–258 indicate the context of the currently-displayed Web page to the user. One of the images 254 represents the currently-displayed Web page 100, as indicated by highlighting 260. The other images, 251–253 and 255–258, represent the Web pages which are immediately adjacent to Web page 100 within the display sequence. The size of the images 251–258 can be appropriately selected to provide the user with a rough indication of the content of the represented Web pages. In addition, the images 251–258 can be made selectable objects, such that the user can randomly access the (full-size) Web page corresponding to any of the reduced size images. Specifically, the user may use the directional buttons 15–18 on remote control 11 to highlight the appropriate image and then press Enter button 19 to cause the selected Web page to be displayed. In this manner, the user can alter the tour by skipping over certain Web pages.

Figure 13:
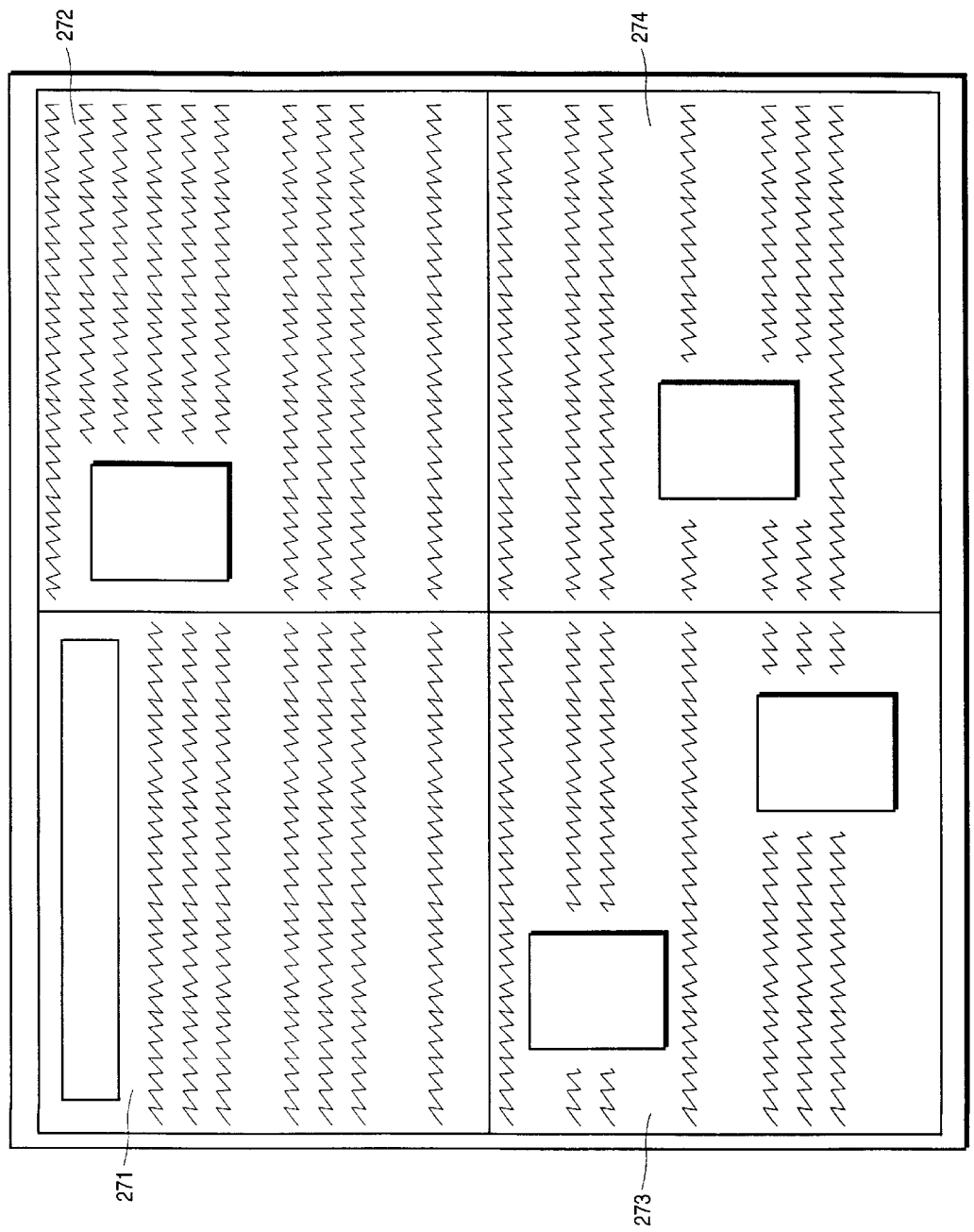
FIG. 13 illustrates a display of reduced-size images of four Web pages.

FIG. 13 illustrates another user interface feature according to which four reduced-size "thumbnail" Web pages 271–274 are displayed. Such a display may be generated, for example, based on a hit list returned by a search engine. For example, the four Web pages determined to be most relevant might be displayed as thumbnail images. Accordingly, the user might initiate a tour by selecting one of the thumbnail images 271–274 as the root page for the tour, using the remote control 11 in the manner described above.

Various other effects may be added to make a Web tour a more television-like experience. For example, transitions between Web pages during a tour might be characterized by fade-in/fade-out, iris opening/closing, Web pages sliding in/out horizontally or vertically, or other similar techniques. In addition, prepackaged tours prepared on the server 5 can be combined with audio information, such as voice narration, music, sound effects, etc.

Thus, a method and apparatus for generating a tour of World Wide Web pages have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a client computer connected to a computer network that includes a plurality of servers, a method of automatically displaying a plurality or hypertext documents on a display device associated with the client computer, the method comprising the steps of:

receiving a document from one of the servers, the document including a plurality of hypertext links to other hypertext documents, wherein the other hypertext documents arc associated with a plurality of Web sites;

without requiring user input to select any of the hypertext links, automatically retrieving the plurality of hypertext documents via the computer network using the hypertext links;

filtering the retrieved plurality of hypertext documents to determine which of the retrieved hypertext documents are to be displayed in a step of automatically displaying; and automatically displaying at least a subset of the plurality of hypertext documents on the display device.

2. A method according to claim 1, wherein the step of automatically displaying at least a subset of the plurality of hypertext documents on the display device comprises the steps of:

automatically displaying a first hypertext document display device; and automatically replacing the first hypertext document on the display device by a second hypertext document after the first hypertext document has been displayed for a period of time.

3. A method according to claim 2, wherein the period of time is determined based on the content of the first hypertext document.

4. A method according to claim 1, wherein the step of automatically displaying at least a subset of the plurality of hypertext documents comprises the step of automatically displaying hypertext documents sequentially until a user input is received.

5. A method according to claim 1, further comprising the step of receiving information specifying a sequence for displaying the plurality of hypertext documents.

6. A method according to claim 1, wherein each of the hypertext documents represents a World Wide Web page.

7. A method according to claim 6, wherein the step of receiving a document comprises the stop of receiving search results of a World Wide Web search.

8. A method according to claim 6, wherein the step of receiving a document comprises the step of receiving a Web page including at least one of the plurality of hypertext links.

9. A method according to claim 1, further comprising the step of displaying on the display device a progress indication, the progress indication indicating a current degree of progress through the step of automatically displaying at least a subset of the plurality of hypertext documents on the display device.

10. A method according to claim 9, wherein the progress indication comprises a plurality of reduced-size images of certain Web pages displayed with a currently displayed Web page.

11. A method according to claim 10, wherein the progress indication further comprises a designation of one of the reduce-size images indicating a position in a display sequence of the currently-displayed Web page with respect to said certain Web pages.

12. A method according to claim 10, further comprising the steps of:

receiving a user input selecting one of the reduced-size images; and in response to the user input selecting one of the reduced-size images, replacing the currently-displayed Web page with a Web page represented by the selected reduced-size image.

13. A method according to claim 1, wherein each of the plurality of hypertext documents is stored on a Web site, and wherein the step of automatically displaying at least a subset of the plurality of hypertext documents on the display device in a sequence comprises the step of automatically displaying the plurality of hypertext documents on the display device in a sequence based on a popularity of each of the Web sites.

14. A method according to claim 1, wherein said filtering step comprises the steps of:

determining which of the retrieved hypertext documents have been previously displayed; and during the step of automatically displaying, prohibiting the redisplaying of any hypertext document previously displayed.

15. In a client computer connected to a computer network that includes a plurality of servers, a method of automatically and sequentially displaying Web pages at the client computer without requiring a user to provide user input specifically requesting any of the Web pages, the method comprising the steps of:

receiving, from one of the servers, a document including information identifying a first plurality of Web pages, the first plurality of Web pages having hypertext links to a second plurality of Web pages;

automatically identifying the second plurality of Web pages based on the hypertext links;

without requiring user input to select any of the information identifying the first plurality of Web pages and any of the hypertext links, retrieving the first plurality of Web pages and the second plurality of Web pages via the computer network; and automatically displaying each of the first plurality of Web pages and the second plurality of Web pages in a sequence on a display device associated with the client computer; and displaying progress indication which indicates a current degree of progress through the automatically displaying step, and wherein the progress indication comprises a plurality of reduced-size images of at least some of the first and second plurality of Web pages, and one of the reduced size images comprising a currently displayed Web page.

16. A method according to claim 15 wherein the step of receiving, from one of the servers, a document including information identifying the first plurality of Web pages comprises the step of receiving a set of hypertext link addresses identifying Web pages that are not marked to be skipped.

17. A method according to claim 16, wherein the set of hypertext link addresses is manually-compiled.

18. A method according to claim 15, wherein the step of automatically displaying each of the first plurality of Web pages and the second plurality of Web pages on a display device associated with the client computer comprises the steps of:

automatically displaying a first Web page on the display device; and automatically replacing the first Web page on the display device by a second Web page after the first Web page has been displayed for a defined period of time.

19. A method according to claim 15, wherein the step of receiving, from one of the servers, a document containing information identifying a first plurality of Web pages comprises the step of receiving results of a search of the World Wide Web.

20. In a server system having a communication link with a client system, a method of enabling the client system to display a plurality of hypertext documents associated with a plurality of Web sites without requiring a user to provide user input specifically requesting any of the hypertext documents, the method comprising the steps of:

identifying a first plurality of hypertext links, each of the first plurality of hypertext links corresponding to one of the plurality of hypertext documents;

filtering the plurality of hypertext documents identified by the first plurality of hypertext links to determine which of the hypertext documents are to be displayed in a step of automatically displaying, and retrieving the filtered hypertext documents that are to be automatically displayed; and transmitting to the client system information identifying the plurality of hypertext links and information indicating a sequence for displaying the filtered hypertext documents without requiring the user to provide user input specifically requesting any of the hypertext documents or the sequence.

21. A method according to claim 20, further comprising the step of determining the sequence for displaying the hypertext documents based on hierarchical distribution.

22. A method according to claim 21, wherein the step of determining the sequence for displaying the hypertext documents based on the hierarchical distribution comprises the step of receiving user inputs for defining the sequence.

23. A method according to claim 20, wherein tile step of identifying the first plurality of hypertext links comprises the step of filtering a second plurality of hypertext links, the second plurality of hypertext links including the first plurality of hypertext links.

24. A method according to claim 23, wherein the step of identifying the first plurality of hypertext links comprises the step of identifying hypertext links to hypertext documents that relate to a given subject.

25. A method according to claim 24, wherein the step of identifying hypertext links comprises the steps of:

receiving a set of hypertext links; determining which of the hypertext links in the set correspond to hypertext documents not sufficiently related to the given subject; and eliminating from consideration the hypertext links in the set which correspond to hypertext documents not sufficiently related to the given subject.

26. A processing system comprising:

a processor; and a memory coupled to the processor, the memory having sequences of instructions stored therein which, when executed by the processor, cause the processing system to performing the following steps:

receiving a first Web page;

identifying a first plurality of hypertext links specified by the Web page, each hypertext link representing one of a first plurality of Web pages;

using the first plurality of hypertext links to retrieve each of the first plurality of Web pages without requiring a user to provide user input specifically requesting any of the first plurality of Web pages;

filtering the retrieved plurality of Web pages to determine which of the retrieved Web pages are to be displayed in a step of automatically displaying; and automatically displaying in a sequence the filtered Web pages on a display device coupled to the processing system without requiring user inputs individually requesting each of the filtered Web pages.

27. A processing system according to claim 26, wherein the instructions which cause the processing system to automatically display the first plurality of Web pages comprise instructions which, when executed by the processor, cause the processing system to:

display a first Web page on the display device; and replace the first Web page on the display device with a second Web page after the first Web page has been displayed for a defined period of time.

28. A processing system according to claim 26, wherein the instructions stored in the memory further comprise instructions which, when executed by the processor, cause the processing system to display a progress indication on the display device, the progress indication indicating a current degree of progress through the sequence.

29. A processing system according to claim 26, wherein the instructions stored in the memory further comprise instructions which, when executed by the processor, cause the processing system to display a plurality of reduced-size images of certain Web pages.

30. A processing system according to claim 29, wherein the instructions stored in the memory further comprise instructions which, when executed by the processor, cause the processing system to display a designation of one of the reduced-size images to indicate the currently-displayed Web page.

31. A processing system according to claim 29, wherein the instructions stored in the memory further comprise instructions which, when executed by the processor, cause the processing system to perform the following steps:

receiving a user input selecting one of the reduced-size images; and in response to the user input, displaying the Web page represented by the selected reduced-size image.

32. In a client computer connected to a computer network that includes a plurality of servers, a method of automatically displaying a plurality of hypertext documents on a display device associated with the client computer, the method comprising the following:

receiving a document from one of the servers, the document including a plurality of hypertext links to other hypertext documents, wherein the hypertext documents arc associated with a plurality of Web sites;

without requiring user input to select any of the hypertext links, automatically retrieving the plurality of hypertext documents via the computer network using at least some of the hypertext links; and automatically displaying at least a subset of the retrieved hypertext documents on the display device; and displaying on the display device a progress indication which indicates a current degree of progress through the automatically displaying step, and wherein the progress indication comprises a plurality of reduced-size images of at least sonic of the subset of hypertext documents displayed, one of the educed size images composing a currently displayed hypertext document.

33. A method according to claim 32, wherein automatically displaying at least a subset of the retrieved hypertext documents comprises the following:

automatically displaying a first hypertext document on the display device; and automatically replacing the first hypertext document on the display device by a second hypertext document after the first hypertext document has been displayed for a period of time.

34. A method according to claim 33, wherein the period of time is determined based on the content of the first hypertext document.

35. A method according to claim 32, further comprising receiving information specifying the sequence for displaying the retrieved hypertext documents.

36. A method according to claim 32, wherein the receiving of the document from one of the servers comprises receiving search results of a World Wide Web search.

37. A method according to claim 32, further comprising filtering the retrieved hypertext documents to identify a subset of the retrieved hypertext documents that are to be displayed.

* * * * *

UNITED STATES PATENT AND TRADEMARK OFFICE
CERTIFICATE OF CORRECTION

PATENT NO. : 6,182,072 B1  Page 1 of 1
DATED : January 30, 2001
INVENTOR(S) : Bruce A. Leak and Michael Killianey It is certified that error appears in the above-identified patent and that said Letters Patent is hereby corrected as shown below:

<u>Title page,</u>
Change title from "METHOD AND APPARATUS FOR GENERATING A TOUR OF WORLD WIDE WEB SITES" to -- GENERATING A TOUR OF WORLD WIDE WEB SITES --

<u>Column 1,</u>
Line 1, delete "[Method and Apparatus for]"
Line 62, after "having" and before "specific" insert -- a --

<u>Column 6,</u>
Line 24, after "understanding" and before "the" insert -- of --

<u>Column 11,</u>
Line 51, after "documents" change "arc" to -- are --

<u>Column 12,</u>
Line 19, after "the" change "stop" to -- step --

<u>Column 13,</u>
Line 67, after "on" and before "hierarchical" insert -- a --

<u>Column 14,</u>
Line 5, after "wherein" change "tile" to -- the --

<u>Column 16,</u>
Line 3, after "least" change "sonic" to -- some --
Line 4, after "of the" change "educed" to -- reduced --
Line 5, before "currently" change "composing" to -- comprising --

Signed and Sealed this

Second Day of April, 2002

*Attest:*

JAMES E. ROGAN
*Attesting Officer*   Director of the United States Patent and Trademark Office